(No Model.)
J. S. & A. RAY.
FORK.
No. 273,154.                    Patented Feb. 27, 1883.
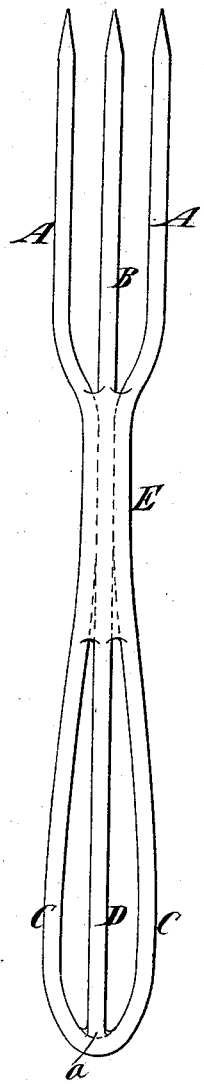
Witnesses:
Ed L Moran
C E Sundgren
Inventors:
James S. Ray
Ashbel Ray
by his Attorneys
Brown & Brown

UNITED STATES PATENT OFFICE.

JAMES S. RAY AND ASHBEL RAY, OF EAST HADDAM, CONNECTICUT.

FORK.

SPECIFICATION forming part of Letters Patent No. 273,154, dated February 27, 1883.

Application filed November 9, 1882. (No model.)

*To all whom it may concern:*

Be it known that we, JAMES S. RAY and ASHBEL RAY, both of East Haddam, in the county of Middlesex and State of Connecticut, have invented a new and useful Improvement in Forks, of which the following is a specification.

Our invention relates to forks for table use, which are made of two or more pieces of wire bent into the required shape and secured together at the proper points.

The invention consists in a fork having a handle composed of a looped wire and a brace extending lengthwise of the loop, soldered or brazed in the spring and bow of the loop, and prolonged through or beyond the shank to form a tine or prong, whereby we provide a fork which may be sold at a low price, and which is strong, light, and of good appearance.

The accompanying drawing represents a fork having three tines or prongs and embodying our invention.

A A designate the two outer tines or prongs of the fork, and B designates the center tine or prong thereof. The handle consists of a loop, C, and a brace, D, which extends lengthwise thereof, the two forming a skeleton handle. The two outer tines, A, and the loop C, which form the outer contour or sides of the handle, are here shown as composed of a single piece of wire. This wire is bent at about the middle of its length to form the loop. Beyond the loop its two portions extend nearly parallel, and at a little distance apart, to form the shank E, and beyond the shank the two portions are bent outward or diverge so as to give the outer tines or prongs the proper spread. The middle tine or prong, B, and the brace D are formed of a single piece of wire, soldered or brazed at *a* to the rounded bow of the loop and extending through the shank, beyond which it is prolonged to form the tine or prong B. The three portions of wire which combine to form the shank E are all soldered or brazed together to strengthen the fork and give it proper rigidity, and the brace D is therefore soldered or brazed in the spring of the loop.

This fork is very strong and light, and it may be plated or finished in any suitable manner to present a handsome appearance.

What we claim as our invention, and desire to secure by Letters Patent, is—

A fork having a handle composed of a looped wire and a brace extending lengthwise of the loop, soldered or brazed in the spring and bow of the loop and prolonged through or beyond the shank to form a tine or prong, substantially as herein described.

JAMES S. RAY.
ASHBEL RAY.

Witnesses:
BERT A. RAY,
THOS. GROW, Jr.